(12) United States Patent
Wu et al.

(10) Patent No.: US 11,310,975 B2
(45) Date of Patent: Apr. 26, 2022

(54) METHOD FOR CULTIVATING MESEMBRYANTHEMUM CRYSTALLINUM

(71) Applicant: 4D Bios Inc., Zhejiang (CN)

(72) Inventors: Xiaoran Wu, Zhejiang (CN); Wei Liu, Zhejiang (CN); Xueli Wu, Zhejiang (CN)

(73) Assignee: 4D Bios Inc., Hangzhou (CN)

( * ) Notice: Subject to any disclaimer, the term of this patent is extended or adjusted under 35 U.S.C. 154(b) by 318 days.

(21) Appl. No.: 16/483,046

(22) PCT Filed: Jul. 23, 2019

(86) PCT No.: PCT/CN2019/097175
§ 371 (c)(1),
(2) Date: Aug. 2, 2019

(87) PCT Pub. No.: WO2020/215506
PCT Pub. Date: Oct. 29, 2020

(65) Prior Publication Data
US 2021/0243974 A1 Aug. 12, 2021

(30) Foreign Application Priority Data
Apr. 23, 2019 (CN) .......................... 201910328994.2

(51) Int. Cl.
*A01G 31/00* (2018.01)
*A01G 24/00* (2018.01)
*A01G 22/00* (2018.01)

(52) U.S. Cl.
CPC ............. *A01G 31/00* (2013.01); *A01G 22/00* (2018.02); *A01G 24/00* (2018.02)

(58) Field of Classification Search
CPC ........ A01G 22/00; A01G 24/00; A01G 24/44; A01G 31/00
See application file for complete search history.

(56) References Cited

U.S. PATENT DOCUMENTS

| 5,992,090 | A | * | 11/1999 | Stutte | ..................... | A01G 31/00 47/58.1 R |
| 2004/0144025 | A1 | * | 7/2004 | Johnson Rutzke | ...... | A01G 7/06 47/57.7 |

(Continued)

FOREIGN PATENT DOCUMENTS

| CN | 106416977 A | | 2/2017 |
| CN | 107047009 A | * | 8/2017 |

(Continued)

OTHER PUBLICATIONS

Yuanjun Huang et al., DFT Hydroponics for African Ice Flowers, Journal of Changjiang Vegetables, Nov. 8, 2015, pp. 41-42, No. 21.

(Continued)

*Primary Examiner* — Joshua D Huson
*Assistant Examiner* — Caleb Kelsey Hrubes

(57) ABSTRACT

The present invention relates to the field of soilless cultivation, in particular to a method for cultivating *Mesembryanthemum crystallinum*. The method involves the following steps: sowing; accelerating germination; growing seedlings; transplanting; separating seedlings; harvesting. In this method, *Mesembryanthemum crystallinum* is cultivated using a nutrient solution and under continuous indoor lighting; as a result, the *Mesembryanthemum crystallinum* has a shortened life cycle, no flowering period, and a long harvesting period. Edible salt is added to the nutrient solution at a specific ratio, which further promotes the growth of *Mesembryanthemum crystallinum* and changes its taste. Meanwhile, the nutrient solution of *Mesembryanthemum crystallinum* has a high EC, which promotes the growth of *Mesembryanthemum crystallinum*. In this method, the step of separating seedlings is carried out at a reasonable time to ensure the quality of *Mesembryanthemum crystallinum* growth, and to fully utilize light energy and growth space.

18 Claims, 2 Drawing Sheets

(56) References Cited

U.S. PATENT DOCUMENTS

| | | | | |
|---|---|---|---|---|
| 2009/0223128 | A1* | 9/2009 | Kuschak | A01G 31/00 47/62 N |
| 2013/0283485 | A1* | 10/2013 | Harriman | A01G 9/0291 800/322 |
| 2014/0115958 | A1* | 5/2014 | Helene | A01G 31/06 47/17 |
| 2014/0259920 | A1* | 9/2014 | Wilson | A01G 22/00 47/62 R |
| 2019/0037792 | A1* | 2/2019 | Leo | A01H 6/28 |
| 2019/0090438 | A1* | 3/2019 | Letton | A01G 24/15 |

FOREIGN PATENT DOCUMENTS

| | | | | |
|---|---|---|---|---|
| CN | 108496776 A | | 9/2018 | |
| CN | 108719033 A | | 11/2018 | |
| CN | 109548584 A | * | 4/2019 | |
| WO | WO-2013118760 A1 | * | 8/2013 | A61Q 19/08 |
| WO | WO-2018145121 A1 | * | 8/2018 | A01G 9/249 |

OTHER PUBLICATIONS

Yuanjun Huang, Deep-flow Hydroponics of African Ice Flowers, Nongcun Baishitong, Jun. 1, 2016, pp. 32-33, No. 11.

International Search Report of PCT Patent Application No. PCT/CN2019/097175 dated Jan. 10, 2020.

* cited by examiner

METHOD FOR CULTIVATING *MESEMBRYANTHEMUM CRYSTALLINUM*

FIELD OF THE INVENTION

The present invention relates to the field of soilless cultivation, in particular to a method for cultivating *Mesembryanthemum crystallinum*.

BACKGROUND OF THE INVENTION

In modern agricultural cultivation, the traditional way of cultivating under sunlight is replaced with the use of LED lighting: plants are illuminated by LED lights in order to undergo photosynthesis. In this way, it is possible to cultivate plants indoors. *Mesembryanthemum crystallinum*, also known as common ice plant, is a vegetable that is not widely known. It is expensive and has a pretty appearance due to the presence of bladder cells that resemble water droplets and ice crystals on its leaves and stems. In terms of nutritional values, *M. crystallinum* contains highly functional substances such as minerals including sodium, potassium, and carotene, and substances that are rarely found in vegetables including acid-resistant substances and amino acids; thus, it is a vegetable that is highly nutritious. *M. crystallinum* is a salt-secreting plant. If grown in saline soil and on the seashore, *M. crystallinum* is able to grow under seawater irrigation. The bladder cells on *M. crystallinum*, which resemble water droplets, contain a natural plant salt, which is a low-sodium salt. As a result, *M. crystallinum* grown in nature has a salty taste without adding any seasonings.

*M. crystallinum* prefers cool or cold environments. It is able to survive in −5 to 30° C., while the optimum growth temperature is 15 to 25° C. The leaves wilt and the plant withers at a temperature below 0° C.; at over 28° C., fasciculation and excessive growth of the plant occurs, as well as the rolling, shrinking and fast aging of the leaves. In addition, the number of bladder cells on the stems and leaves are decreased, and plant quality declines. *M. crystallinum* is a C3/CAM convertible model plant.

Some companies and inventors contemplate and manufacture indoor planting devices for fruits, vegetables, or flowers. These planting devices cultivate plants by hydroponic cultivation, in which plants are immersed in a nutrient solution, and grown by absorbing the nutrients from the nutrient solution for photosynthesis. For example, Chinese patent publication No. CN108719033A has disclosed a method for the hydroponic cultivation of *M. crystallinum*; Chinese patent publication No. CN108496776A has disclosed a method for planting *M. crystallinum* in a plant factory. However, the indoor cultivation techniques of the prior art employ conventional plant cultivation techniques, which are not well-suited to the growth habits of *M. crystallinum*. As a result, the growth cycle, yield, the appearances of the leaves and the taste of *M. crystallinum* are less than satisfactory.

SUMMARY OF THE INVENTION

In view of this, the present invention provides a method for cultivating *M. crystallinum*. The cultivation method allows the cultivation of *M. crystallinum* in a long-term and continuous manner via a cultivation technique in a non-natural environment; it also ensures that the appearance and taste of *M. crystallinum* meet the standards of the general consumers. In particular, a certain amount of edible salt is added to the nutrient solution to allow *M. crystallinum* to have a certain salty taste, and thus no further seasoning is necessary.

In order to achieve the above objectives, the present invention provides the following technical solutions:

The invention provides a method for cultivating *M. crystallinum*, comprising the steps of:

Sowing: putting *M. crystallinum* seeds in each dent of sponga which soaked thoroughly.

Accelerating germination: accelerating germination of the seeds of *M. crystallinum*;

Growing seedlings: draining water on surfaces of the sponges; adding a nutrient solution containing potassium hydroxide and sodium chloride to a plate for growing seedlings;

Transplanting: transplanting the seedlings after each seedling has two true leaves; planting the seedlings attached with the sponges in growing wells; and culturing hydroponically using the nutrient solution containing potassium hydroxide and sodium chloride;

Separating seedlings: separating the seedlings after each seedling has four to five true leaves; continuing culturing hydroponically;

Harvesting.

Preferably, the step of accelerating germination is performed under LED illumination with a light cycle of 24 h, a temperature of 15 to 25° C., a carbon dioxide concentration of 600 to 1200 ppm, and for 5 to 6 days.

Preferably, the nutrient solution containing potassium hydroxide and sodium chloride has a pH of 5.5 to 6.5 and an EC of 6 to 12 mS/cm.

Preferably, the nutrient solution containing potassium hydroxide and sodium chloride has a sodium chloride concentration of 2.8 to 5.6 g/L, which adjusts the EC of the nutrient solution to 6 to 12 mS/cm.

Preferably, the nutrient solution containing potassium hydroxide and sodium chloride has an EC of 8 to 12 mS/cm.

Preferably, the nutrient solution containing potassium hydroxide and sodium chloride has a sodium chloride concentration of 3.7 to 5.6 g/L.

Preferably, carrying out solution replenishment during the step of growing seedlings; the frequency of the solution replenishment is once every 2 to 3 days.

Preferably, during the transplanting step, after transplantation, monitoring the EC and pH of the nutrient solution daily; adding potassium hydroxide to the nutrient solution to adjust the pH to 5.5-6.5 when the pH is below 5.5; changing the nutrient solution every 10 to 15 days.

Preferably, performing the step of growing seedlings under LED illumination with a light cycle of 24 h and a temperature of 15 to 25° C.

Preferably, the step of growing seedlings is performed at a temperature of 18 to 22° C.

Preferably, culturing hydroponically at the following illumination conditions: a light intensity of 200 to 300 μmol/m$^2$/s of an LED planting lamp, a light cycle of 8 to 16 h, and a DLI of 15 to 17 mol/m$^2$ day.

Preferably, culturing hydroponically at the following illumination conditions: a light intensity of 280 μmol/m$^2$/s of an LED planting lamp, a light cycle of 16 h, and a DLI of 16.2 mol/m$^2$ day.

Preferably, culturing hydroponically at the following culturing conditions: a temperature during the light cycle controlled at 22±2° C., a carbon dioxide concentration controlled at 1000 to 1200 ppm, a temperature during dark controlled at 18±2° C., without supplementing carbon dioxide.

In an embodiment provided by the present invention, the transplanting step is performed once or twice.

Preferably, the density of the seedlings in the step of separating seedlings is 15 to 17 seedlings/m$^2$.

Preferably, the density of the seedlings in the step of separating seedlings is 16 seedlings/m$^2$.

In an embodiment provided by the present invention, the step of separating seedlings is performed once or twice.

Preferably, the criterion for harvesting is that a branch of *M. crystallinum* grows to 3 to 4 cm, or a bud after the previous harvesting grows to 4 to 6 cm.

The invention provides a method for cultivating *M. crystallinum*, comprising the following steps:

sowing; accelerating germination; growing seedlings: draining water on a surface of a sponge, adding a nutrient solution containing potassium hydroxide and sodium chloride to a plate for growing seedlings; transplanting; separating seedlings; harvesting. The technical effects of the present invention are as follows:

1. In the method of the present invention, *M. crystallinum* is cultivated using a nutrient solution and under continuous indoor lighting; as a result, the *M. crystallinum* has a faster growth rate, and a long harvesting period.

2. In the method of the present invention, edible salt is added to the nutrient solution at a specific ratio, which further promotes the growth of *M. crystallinum* and changes its taste. Meanwhile, the cultivation medium of *M. crystallinum* has a high EC, which triggers *M. crystallinum* to exhibit their unique characteristics, and promotes the growth of *M. crystallinum*.

3. In the method of the present invention, the step of separating seedlings is carried out at a reasonable time to ensure the quality of *M. crystallinum*, and to fully utilize light energy and growth space.

BRIEF DESCRIPTION OF THE DRAWINGS

FIGS. 2-1 and 2-2 show that *M. crystallinum* after the first transplanting step has reached the standard for the separating seedlings step, wherein FIG. 2-1 shows the *M. crystallinum* seedlings in separating seedlings; FIG. 2-2 shows the condition of the roots of *M. crystallinum* seedlings in the separating seedlings step.

DETAILED DESCRIPTION OF THE ILLUSTRATED EMBODIMENTS

The invention discloses a method for cultivating *M. crystallinum*, and those skilled in the art can adjust process parameters according to the content of the present disclosure. It is to be understood that all such alternatives and modifications are obvious to those skilled in the art and are considered to be included in the present invention. The method and the application of the present invention are described by the preferred embodiments, and it is obvious that the method and application described herein may be modified or appropriately changed and combined, without departing from the content, spirit, and scope of the present invention, in order to achieve and apply the technical solution of the present invention.

The LED illumination used in the present invention is red, blue and white LED lights, and the LED lights are commercially purchased.

The tools used in the method of cultivating *M. crystallinum* provided by the present invention are commercially available.

The present invention is further illustrated below with reference to the embodiments.

Embodiment 1

The method for cultivating *M. crystallinum* in a plant factory include the steps of sowing, accelerating germination, growing seedlings, transplanting, separating seedlings, and harvesting. Specifically:

1. Preparation and sowing:

Disinfecting materials and tools: tweezers specifically designed for growing seedlings, Petri dishes, sponges for growing seedlings, among others were sterilized in a high-pressure steam sterilization pot at 120° C. for 20 minutes, and were allowed to cool under UV light after taken out from the pot for further use.

Soaking the sponges for growing seedlings: a disinfected plate set for growing seedlings was taken out; RO water (reverse osmosis water) was added to a blue water tank; a row of sponges was torn off from a sponge block; sponge blocks were put in RO water to fully absorb water; two pieces of sponge blocks were put into each plate for growing seedlings, the plates were horizontally shaken to evenly spread out the sponges; the sponges were gently pressed by hand to ensure no gaps were left in each well.

Sowing: seeds of *M. crystallinum* were picked up from a petri dish with a tweezer; one seed was put into a round hole of each planting sponge, labels indicating the crop type and the date of planting were inserted.

Figure 1:
FIG. 1 shows a covered plate for growing seedlings after sowing.

Spraying water: RO water was added into a watering can; the surfaces of the seeds were sprayed for about 30 s so that the surfaces of the seeds were fully moisturized; the seeds were covered with a transparent cover (as shown in FIG. 1).

2. Accelerating germination: day 0 to 5

The plate for growing seedlings was placed on a seedling growing rack; the light cycle (LED light) was 24 hours, the temperature was 18 to 22° C., and the carbon dioxide concentration was set to 800 to 1000 ppm.

3. Growing seedlings: days 6 to 20

Controlling water content in the sponges: the transparent cover was removed; the plate for growing seedlings was taken out; the plate was tilted to allow water in the sponges to flow out from one corner; by controlling the water content in the sponges, the growth of algae on the surfaces of the sponges could be avoided.

Preparing a nutrient solution for growing seedlings: approximately 16 mL of 1 mol/L KOH was added to 100 L of a Hoagland nutrient solution, followed by the addition of 440 g of an edible salt, EC (the concentration of soluble salts) of the nutrient solution was adjusted to 8 to 10 mS/cm, pH was adjusted to 6.0±0.1.

The Hoagland nutrient solution was prepared as follows:

1) Mother liquid 1: calcium nitrate (concentration in the nutrient solution: 0.004 mol/L)

500 mL mother liquid (500×), weighing 236.15 g of $Ca(NO_3)_2 \cdot 4H_2O$;

2) Mother liquid 2: potassium nitrate (concentration in the nutrient solution: 0.005 mol/L)

500 mL mother liquid (500×), weighing 126.375 g of $KNO_3$;

3) Mother liquid 3: ammonium nitrate (concentration in the nutrient solution: 0.001 mol/L)

500 mL mother liquid (1000×), weighing 40.00 g of $NH_4NO_3$;

4) Mother liquid 4: potassium dihydrogen phosphate (concentration in the nutrient solution: 0.001 mol/L)

500 mL mother liquid (1000×), weighing 68.045 g of $KH_2PO_4$;

5) Mother liquid 5: magnesium sulfate heptahydrate (concentration in the nutrient solution: 0.002 mol/L)

500 mL mother liquid (500×), weighing 123.235 g of $MgSO_4.7H_2O$;

6) Mother liquor 6: iron salt

Weighing 500 mL mother liquid: 1000×;

| $FeSO_4 \cdot 7H_2O$ (20 mM-20 μM) | $Na_2$-EDTA | Or | EDTA-Fe (20 mM-20 μM) |
|---|---|---|---|
| 2.78 g | 3.73 g | | 4.211 g |

7) Mother liquid 7: trace

Weighing 500 mL mother liquid: 4000×;

| $CoCl_2 \cdot 6H_2O$ (0.1 μM) | $H_3BO_3$ (0.1 mM) | $ZnSO_4 \cdot 7 H_2O$ (30 μM) | $CuSO_4 \cdot 5 H_2O$ (0.1 μM) |
|---|---|---|---|
| 0.05 g | 12.366 g | 17.2 g | 0.05 g |
| $NaM_oO_4 \cdot 2H_2O$ (1 μM) | KI (5 μM) | $MnSO_4 \cdot H_2O$ (0.13 mM) | |
| 0.484 g | 1.66 g | 44.6 g | |

8) The preparation of 1 L of the nutrient solution

| Mother liquid 1 | Mother liquid 2 | Mother liquid 3 | Mother liquid 4 | Mother liquid 5 | Mother liquid 6 | Mother liquid 7 |
|---|---|---|---|---|---|---|
| 2 mL | 2 mL | 1 mL | 1 mL | 2 mL | 1 mL | 0.25 mL |

The pH was 6.0 (thoroughly mixing was required)

Note: the preparation of Fe (100×) was as follows:

5.57 g of $FeSO_4.7H_2O$ was dissolved in 200 mL of distilled water, then 7.45 g $Na_2$_EDTA was dissolved in 200 mL of distilled water; $Na_2$_EDTA was heated (about 70° C.); $FeSO_4.7H_2O$ was added, stirring constantly; then, chelating in an incubator at 70° C. for 2 h; cooling and bringing to a volume of 1 L; storing in a brown bottle.

Around 1.5 L of the nutrient solution was added to each plate for growing seedlings, and the amount of nutrient solution in the plate was checked every 2-3 days for sufficient and timely replenishment.

4. The first transplanting: day 20

The plates for growing seedlings were transported to a transplant cart with a vegetable cart; a suitable water container was prepared for receiving RO water.

As the *M. crystallinum* seedlings grew at different speeds, they needed to be transplanted twice. For the first transplanting, *M. crystallinum* seedlings which grew well and had leaves that touch each other were selected; the sponges attached to the seedlings to be transplanted were torn off; after the roots are moisturized, excess water in the sponges was squeezed out over a cup, and water was allowed to flow into the cup along the roots, thereby allowing the roots to gather. The roots and the sponges were placed in growing wells in turn, wherein each sponge was inserted into the upper end of a growing well, the upper surface of the sponge was 0.5 cm above the upper end of the plate for growing. After the transplant was completed, the roots were checked to see if they extended out of the growing wells at the back.

Preparing the nutrient solution; a water pumping circulation in a close planting area was switched on; the planting plate holding the seedlings transplanted was placed in a designated position.

After transplanting, the EC and pH values of the nutrient solution were monitored daily. When the pH value dropped to about 5.2, 1 mol/L KOH solution was added to the nutrient solution to adjust the pH and maintaining the pH in a normal range of 5.5 to 6.5. The nutrient solution replacement was performed every 10 to 15 days.

Starting illumination: LED planting lamps were turned on, their light intensity was 280 μmol/m²/s, the light cycle was set to 16 h, DLI was 16.2 mol/m² day. *M. crystallinum* prefers cool and shady environments, and hence does not require strict illumination conditions. However, if the light cycle would be too short, *M. crystallinum* is likely to bloom during the cultivation process, and thus cannot be eaten. If the light cycle is too long, it would exceed the limits of plant growth, affecting plant growth. The light cycle needs to be matched with environmental factors such as the components of the nutrients, the temperature, and carbon dioxide concentration.

The temperature during the light cycle was controlled at 22±2° C., carbon dioxide concentration was controlled at 1000 to 1200 ppm, and temperature during dark was controlled at 18±2° C. Carbon dioxide was not replenished at night.

5. The second transplanting: day 30

The method for the transplanting step was the same as above.

6. The first separating seedlings: day 33

Figures 1, 2:
Figure 2:
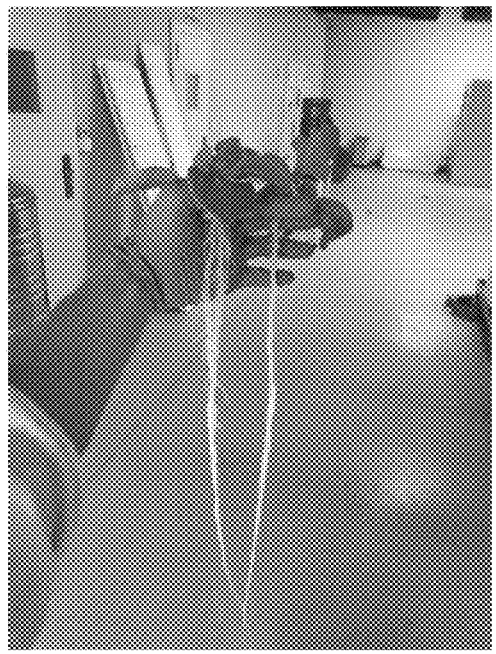

The criteria for separating seedlings were as follows: the leaves of *M. crystallinum* spread to about 12 cm, and leaves of adjacent *M. crystallinum* seedlings touch each other. The seedlings of *M. crystallinum* for separating seedlings step and the state of their roots are shown in FIG. 2. When separating the seedlings, the seedlings of *M. crystallinum* were pulled out from a close planting plate, and care was taken to not damage the roots of *M. crystallinum* since the roots were long. During the separating seedlings step, the roots of each *M. crystallinum* plant were carefully placed into a planting well, and then inserting a planting sponge into the planting well. The density of the seedlings in the step of separating seedlings was about 16 seedlings/m². The upper surface of the sponge was about 0.5 cm above the planting plate.

The seedlings were separated after each seedling has four to five true leaves.

When growing in an environment in which a certain amount of edible salts is added, seedlings in close proximity will interact with each other and the edges of the leaves will turn red, which affects the color and taste of the harvested plants. This does not occur in other leafy green vegetables such as lettuce. Therefore, it is necessary to make reasonable arrangements for seedlings separation.

7. The second separating seedlings: day 48

The method for the separating seedlings step was the same as above.

8. First harvest: day 56

The criteria for harvesting are reached when branches of *M. crystallinum* grows to 3 to 4 cm. The planting board was removed from a planting water tank and placed on a harvesting cart. Scissors for harvesting were disinfected with a 75% alcohol spray before use. During harvesting, about 6-8 buds were left in each plant; the buds were left in a position close to the center of each *M. crystallinum* plant. During the first harvesting, the leaves that were large and thick were harvested together with the branches.

9. Continuous harvesting: day 76 to 140

The next round of harvesting was carried out when the buds left after the previous harvesting step grew to a length of about 5 cm.

After 180 days, the growth rate of *M. crystallinum* slowed down. It is recommended to finish harvesting and replace the old *M. crystallinum* plants with new ones.

Test Example 1

In step 3, growing seedlings, of embodiment 1, groups of seedlings to which no edible salts were added, or different concentrations of edible salts were added were set up, their growth cycle and the total yield per plant were recorded, and their taste was assessed. The results are as follows.

The results show that compared with salt addition during transplanting, salt addition starting at the seedling period could further accelerate the growth of *M. crystallinum*. The first harvesting time is earlier, the harvesting cycle of *M. crystallinum* is prolonged, and the total yield per plant is thus increased.

Embodiment 2

In this embodiment, except for the preparation of the nutrient solution is slightly different, other steps were the same as the steps in embodiment 1.

An Enshi nutrient solution was prepared as follows:

1) Mother liquid 1: calcium nitrate (concentration in the nutrient solution: 4.03 mM/L)

500 mL mother liquid (500×), weighing 237.935 g of $Ca(NO_3)_2 \cdot 4H_2O$;

TABLE 1

PLANT GROWTH WHEN SALTS WERE ADDED OR NOT ADDED TO THE NUTRIENT SOLUTION

| Were salts added to the nutrient solution | EC (ms/cm) | Accelerating germination (day) | Seedling period (day) | Transplanting to separating seedlings (day) | Separating seedlings to $1^{st}$ harvest (day) | Harvesting period (day) | Growth cycle (day) | Yield per plant (kg) | Taste |
|---|---|---|---|---|---|---|---|---|---|
| No salts added | 1.2 | 4 | 15 | 15 | 29 | 70 | 133 | 1.3 | Not salty |
| Salts added | 3 | 4 | 14 | 13 | 26 | 75 | 132 | 1.4 | Very mildly salty, crunchy |
| (from seedling | 6 | 4 | 14 | 13 | 25 | 83 | 139 | 1.6 | Slightly salty, crunchy |
| period) | 8 | 4 | 12 | 12 | 20 | 112 | 160 | 2.1 | Moderately salty, crunchy |
| | 12 | 4 | 12 | 13 | 21 | 101 | 151 | 2.0 | Salty, crunchy |
| | 15 | 4 | 13 | 13 | 21 | 97 | 148 | 1.9 | Very salty, crunchy |

The results show that adding salts to the nutrient solution at the beginning of the seedling period could further accelerate the growth of *M. crystallinum*. The first harvesting time is earlier, the harvesting cycle of *M. crystallinum* is prolonged, and the total yield per plant is thus increased. Preferably the EC value is 8~12 ms, at which the average yield per *M. crystallinum* plant is the highest. Furthermore, adding salt allows *M. crystallinum* to have a certain salty taste and become crunchy; no additional seasonings are required.

Test Example 2

In step 3, growing seedlings, of embodiment 1, groups of seedlings to which edible salts were added at the seedling period and the transplanting period were set up, their growth cycle and the total yield per plant were recorded. The results are as follows.

2) Mother liquid 2: potassium nitrate (concentration in the nutrient solution: 8.02 mM/L)

500 mL mother liquid (500×), weighing 202.725 g of $KNO_3$;

3) Mother liquid 4: ammonium dihydrogen phosphate (concentration in the nutrient solution: 1.35 mM/L)

500 mL mother liquid (1000×), weighing 38.822 g of $NH_4H_2PO_4$:

5) Mother liquid 5: magnesium sulfate heptahydrate (concentration in the nutrient solution: 2.03 mM/L)

500 mL mother liquid (500×), weighing 125.090 g of $MgSO_4 \cdot 7H_2O$;

6) Mother liquid 6: sodium iron EDTA (concentration in the nutrient solution: 0.06 mM/L)

500 mL mother liquid (1000×), weighing 12.603 g of $C_{10}H_{12}N_2O_8FeNa \cdot 3H_2O$;

7) Mother liquor 7: trace

Weighed 500 mL mother liquor: 4000×

TABLE 2

PLANT GROWTH WHEN SALTS WERE ADDED AT DIFFERENT TIME POINTS TO THE NUTRIENT SOLUTION

| The time point of salt addition | Accelerating germination (day) | Seedling period (day) | Transplanting to separating seedlings (day) | Separating seedlings to $1^{st}$ harvest (day) | Harvesting period (day) | Growth cycle (day) | Yield per plant (kg) |
|---|---|---|---|---|---|---|---|
| Transplanting | 4 | 15 | 13 | 22 | 99 | 153 | 1.9 |
| Seedling | 4 | 12 | 12 | 20 | 112 | 160 | 2.1 |

Note:
before salt addition, the concentration of the nutrient solution was 1.2 ms/cm; after salt addition, the concentration of the nutrient solution was 8 ms/cm.

| $H_3BO_3$ (0.05 mM) | $ZnSO_4 \cdot 7 H_2O$ (0.764 μM) | $MnSO_4 \cdot H_2O$ (8.3 μM) | $CuSO_4 \cdot 5 H_2O$ (0.2 μM) | $NaM_oO_4 \cdot 2H_2O$ (1 μM) |
|---|---|---|---|---|
| 6.183 g | 0.439 g | 2.806 g | 0.10 g | 0.484 g |

The preparation of 1 L of the nutrient solution:

| Mother liquid 1 | Mother liquid 2 | Mother liquid 3 | Mother liquid 4 | Mother liquid 5 | Mother liquid 6 | Mother liquid 7 |
|---|---|---|---|---|---|---|
| 2 mL | 2 mL | 1 mL | 1 mL | 2 mL | 1 mL | 0.25 mL |

*M. crystallinum* was cultivated using the nutrient solution above, and the effects with or without salt addition were compared. Growth cycle and the total yield per plant were recorded, and the taste was assessed. The results are as follows.

TABLE 3

PLANT GROWTH WHEN SALTS WERE ADDED OR NOT ADDED TO THE NUTRIENT SOLUTION

| Were salts added to the nutrient solution | EC (ms/cm) | Accelerating germination (day) | Seedling period (day) | Transplanting to separating seedlings (day) | Separating seedlings to 1st harvest (day) | Harvesting period (day) | Growth cycle (day) | Yield per plant (kg) | Taste |
|---|---|---|---|---|---|---|---|---|---|
| No salts added | 1.2 | 4 | 16 | 17 | 30 | 72 | 139 | 1.2 | Not salty |
| Salts added (from seedling period) | 3 | 4 | 14 | 15 | 28 | 76 | 137 | 1.3 | Very mildly salty, crunchy |
| | 6 | 4 | 13 | 13 | 25 | 88 | 143 | 1.6 | Slightly salty, crunchy |
| | 8 | 4 | 11 | 12 | 22 | 110 | 159 | 2.4 | Moderately salty, crunchy |
| | 12 | 4 | 14 | 13 | 23 | 99 | 153 | 2.1 | Salty, crunchy |
| | 15 | 4 | 13 | 14 | 25 | 95 | 151 | 1.9 | Very salty, crunchy |

TABLE 4

PLANT GROWTH WHEN SALTS WERE ADDED AT DIFFERENT TIME POINTS TO THE NUTRIENT SOLUTION

| The time point of salt addition | Accelerating germination (day) | Seedling period (day) | Transplanting to separating seedlings (day) | Separating seedlings to 1st harvest (day) | Harvesting period (day) | Growth cycle (day) | Yield per plant (kg) |
|---|---|---|---|---|---|---|---|
| Transplanting | 4 | 14 | 13 | 23 | 100 | 154 | 2.0 |
| Seedling | 4 | 11 | 12 | 22 | 110 | 159 | 2.4 |

Note:
before salt addition, the concentration of the nutrient solution was 1.2 ms/cm; after salt addition, the concentration of the nutrient solution was 8 ms/cm.

Embodiment 3

In the present embodiment, the other steps were the same as in the first embodiment except that the pH of the nutrient solution was different. pH values were set to 4.5, 5, 5.5, 6.5, 7 or 7.5.

When pH was 5.5 or 6.5, the growth of *M. crystallinum* was similar to that of embodiment 1.

When the pH value was less than 5.5 or greater than 6.5, the *M. crystallinum* was exposed to environmental stress, the leaves turned red, and the roots turned yellow as a result of prolonged exposure to unsuitable pH. The growth rate and taste of the plants were also affected.

The description above is only a preferred embodiment of the present invention, and it should be noted that those skilled in the art can also make various improvements and progresses without departing from the principles of the present invention; these improvements and progresses It should be considered as within the scope of the present invention.

What is claimed is:

1. A method for cultivating *Mesembryanthemum crystallinum*, wherein the method comprises the following steps:
    S1: sowing *Mesembryanthemum crystallinum* seeds in each dent of thoroughly soaked sponge;
    S2: allowing the seeds of *Mesembryanthemum crystallinum* to germinate;
    S3: growing *Mesembryanthemum crystallinum* seedlings in a plate containing a nutrient solution after surfaces of the sponge are dried; wherein the nutrient solution comprises potassium hydroxide and sodium chloride, and has a pH of 5.5 to 6.5 and an EC of 6 to 12 mS/cm;
    S4: transplanting the seedlings with the sponge attached to a plurality of growing wells after each seedling has two true leaves; and hydroponically growing the seedlings in the nutrient solution;
    S5: separating the seedlings after each seedling has four to five true leaves and continue growing hydroponically;
    S6: harvesting.

2. The method for cultivating *Mesembryanthemum crystallinum* according to claim 1, wherein the seeds of *Mesembryanthemum crystallinum* are allowed to germinate under LED illumination with a light cycle of 24 h, at 15 to 25° C. and a carbon dioxide concentration of 600 to 1200 ppm for 5 to 6 days.

3. The method for cultivating *Mesembryanthemum crystallinum* according to claim 2, wherein S6 is performed when a branch of *Mesembryanthemum crystallinum* is 3 to 4 cm or a bud of *Mesembryanthemum crystallinum* is 4 to 6 cm.

4. The method for cultivating *Mesembryanthemum crystallinum* according to claim 1, wherein the nutrient solution has a sodium chloride concentration of 2.8 to 5.6 g/L.

5. The method for cultivating *Mesembryanthemum crystallinum* according to claim 4, wherein S6 is performed when a branch of *Mesembryanthemum crystallinum* is 3 to 4 cm or a bud of *Mesembryanthemum crystallinum* is 4 to 6 cm.

6. The method for cultivating *Mesembryanthemum crystallinum* according to claim 1, wherein the EC of the nutrient solution is 8 to 12 mS/cm.

7. The method for cultivating *Mesembryanthemum crystallinum* according to claim 6, wherein the nutrient solution has a sodium chloride concentration of 3.7 to 5.6 g/L.

8. The method for cultivating *Mesembryanthemum crystallinum* according to claim 7, wherein S6 is performed when a branch of *Mesembryanthemum crystallinum* is 3 to 4 cm or a bud of *Mesembryanthemum crystallinum* is 4 to 6 cm.

9. The method for cultivating *Mesembryanthemum crystallinum* according to claim 1, wherein in S3, the nutrient solution is replenished once every 2 to 3 days.

10. The method for cultivating *Mesembryanthemum crystallinum* according to claim 1, wherein after transplanting the seedlings to the growing wells, monitoring the EC and the pH of the nutrient solution daily; adding potassium hydroxide to the nutrient solution to adjust the pH to 5.5-6.5 when the pH is below 5.5; changing the nutrient solution every 10 to 15 days.

11. The method for cultivating *Mesembryanthemum crystallinum* according to claim 1, wherein in S3, the *Mesembryanthemum crystallinum* seedlings are grown at 15 to 25° C. under LED illumination with a light cycle of 24 h.

12. The method for cultivating *Mesembryanthemum crystallinum* according to claim 1, wherein in S3, the *Mesembryanthemum crystallinum* seedlings are grown at 18 to 22° C.

13. The method for cultivating *Mesembryanthemum crystallinum* according to claim 1, wherein in S4 and S5, the seedlings are hydroponically grown under an LED planting lamp with a light intensity of 200 to 300 μmol/m²/s, a light cycle of 8 to 16 h, and a DLI of 15 to 17 mol/m² day.

14. The method for cultivating *Mesembryanthemum crystallinum* according to claim 1, wherein in S4 and S5, the seedlings are hydroponically grown at the following conditions:

Illumination period: temperature controlled at 22±2° C., dioxide concentration controlled at 1000 to 1200 ppm;

Dark period: temperature controlled at 18±2° C., no carbon dioxide supplement.

15. The method for cultivating *Mesembryanthemum crystallinum* according to claim 1, wherein S4 is performed once or twice.

16. The method for cultivating *Mesembryanthemum crystallinum* according to claim 1, wherein in S5, the seedlings are arranged at a density of 15 to 17 seedlings/m².

17. The method for cultivating *Mesembryanthemum crystallinum* according to claim 1, wherein S5 is performed once or twice.

18. The method for cultivating *Mesembryanthemum crystallinum* according to claim 1, wherein S6 is performed when a branch of *Mesembryanthemum crystallinum* is 3 to 4 cm, or a bud of *Mesembryanthemum crystallinum* is 4 to 6 cm.

* * * * *